(12) United States Patent
Sturgeon et al.

(10) Patent No.: US 12,062,794 B2
(45) Date of Patent: Aug. 13, 2024

(54) ELECTRICAL POWER STORAGE DEVICES

(71) Applicants: CPS Technology Holdings LLC, New York, NY (US); Clarios Germany GmbH & Co. KG, Hannover (DE)

(72) Inventors: Richard M. Sturgeon, Ann Arbor, MI (US); Dennis A. Wetzel, Saline, MI (US); Robert G. Gruenstern, Milwaukee, WI (US); William J. Wruck, Whitefish Bay, WI (US); Ramachadran Subbaraman, Fox Point, WI (US); James Symanski, Greenfield, WI (US); Eberhard Meissner, Wunstorf (DE)

(73) Assignees: CPS Technology Holdings LLC, New York, NY (US); Clarios Germany GmbH & Co. KG, Hannover (DE)

( * ) Notice: Subject to any disclaimer, the term of this patent is extended or adjusted under 35 U.S.C. 154(b) by 0 days.

(21) Appl. No.: 18/341,673

(22) Filed: Jun. 26, 2023

(65) Prior Publication Data

US 2024/0021840 A1  Jan. 18, 2024

Related U.S. Application Data

(60) Continuation of application No. 17/080,226, filed on Oct. 26, 2020, now abandoned, which is a (Continued)

(51) Int. Cl.
*H01M 4/68* (2006.01)
*H01G 11/24* (2013.01)
(Continued)

(52) U.S. Cl.
CPC .............. *H01M 4/68* (2013.01); *H01G 11/24* (2013.01); *H01G 11/28* (2013.01); *H01G 11/34* (2013.01);
(Continued)

(58) Field of Classification Search
None
See application file for complete search history.

(56) References Cited

U.S. PATENT DOCUMENTS 4,237,205 A  12/1980  Matter
4,284,691 A   8/1981  Goebel et al.
(Continued)

FOREIGN PATENT DOCUMENTS

CN  1056190 A  11/1991
CN  1025136 C   6/1994
(Continued)

OTHER PUBLICATIONS

Extended European Search Report dated Apr. 11, 2016, received in connection with EP Application No. 15198198.2.
(Continued)

*Primary Examiner* — Jonathan Crepeau
(74) *Attorney, Agent, or Firm* — Boardman & Clark LLP

(57) ABSTRACT

An electrical storage device includes high surface area fibers (e.g., shaped fibers and/or microfibers) coated with carbon (graphite, expanded graphite, activated carbon, carbon black, carbon nanofibers, CNT, or graphite coated CNT), electrolyte, and/or electrode active material (e.g., lead oxide) in electrodes. The electrodes are used to form electrical storage devices such as electrochemical batteries, electrochemical double layer capacitors, and asymmetrical capacitors.

13 Claims, 8 Drawing Sheets

Related U.S. Application Data continuation of application No. 15/352,186, filed on Nov. 15, 2016, now Pat. No. 10,818,930, which is a division of application No. 13/129,323, filed as application No. PCT/US2009/064992 on Nov. 18, 2009, now Pat. No. 9,525,177.

(60) Provisional application No. 61/150,987, filed on Feb. 9, 2009, provisional application No. 61/115,815, filed on Nov. 18, 2008.

(51) Int. Cl.
    H01G 11/28      (2013.01)
    H01G 11/34      (2013.01)
    H01G 11/36      (2013.01)
    H01G 11/40      (2013.01)
    H01M 4/62       (2006.01)
    H01M 4/66       (2006.01)
    H01M 4/73       (2006.01)
    H01M 4/74       (2006.01)
    H01M 10/12      (2006.01)

(52) U.S. Cl.
    CPC ............ *H01G 11/36* (2013.01); *H01G 11/40* (2013.01); *H01M 4/625* (2013.01); *H01M 4/663* (2013.01); *H01M 4/667* (2013.01); *H01M 4/668* (2013.01); *H01M 4/73* (2013.01); *H01M 4/74* (2013.01); *H01M 10/12* (2013.01); *H01M 2220/20* (2013.01)

(56) References Cited

U.S. PATENT DOCUMENTS

| | | | |
|---|---|---|---|
| 4,440,838 | A | 4/1984 | Schmidt |
| 4,865,933 | A | 9/1989 | Blanyer et al. |
| 5,057,368 | A * | 10/1991 | Largman .......... D01D 5/253 428/397 |
| 5,518,836 | A | 5/1996 | McCullough |
| 5,580,685 | A | 12/1996 | Schenk |
| 5,821,012 | A | 10/1998 | McCullough et al. |
| 6,117,802 | A | 9/2000 | Xue et al. |
| 6,766,817 | B2 | 7/2004 | Da Silva |
| 9,525,177 | B2 | 12/2016 | Sturgeon et al. |
| 10,818,930 | B2 | 10/2020 | Sturgeon et al. |
| 2002/0150822 | A1 | 10/2002 | Marlow |
| 2003/0049528 | A1 | 3/2003 | Honbo |
| 2004/0018428 | A1 | 1/2004 | Cochran et al. |
| 2006/0166074 | A1 | 7/2006 | Pan et al. |
| 2007/0154807 | A1 | 7/2007 | Kalynushikin et al. |
| 2008/0176139 | A1 | 7/2008 | White et al. |
| 2009/0148760 | A1 | 6/2009 | Justice et al. |
| 2009/0269666 | A1 | 10/2009 | Lara-Curzio et al. |

FOREIGN PATENT DOCUMENTS

| | | |
|---|---|---|
| CN | 1152342 A | 6/1997 |
| CN | 1408127 A | 4/2003 |
| CN | 1487615 A | 4/2004 |
| CN | 1507099 A | 6/2004 |
| CN | 1584141 A | 2/2005 |
| CN | 1789120 A | 6/2006 |
| CN | 1797824 A | 7/2006 |
| CN | 1830103 A | 9/2006 |
| CN | 101271969 A | 9/2008 |
| EP | 0551227 | 7/1993 |
| EP | 1385228 A2 | 1/2004 |
| FR | 2788168 A1 | 7/2000 |
| JP | S60112258 A | 6/1985 |
| JP | S628448 A | 1/1987 |
| JP | H01 105460 A | 4/1989 |
| JP | H08138562 A | 5/1996 |
| JP | 2003-532799 A | 11/2003 |
| JP | 2006 196751 A | 7/2006 |
| WO | 94/17224 | 8/1994 |
| WO | 00/75403 A1 | 12/2000 |
| WO | 01/35474 A | 5/2001 |
| WO | 01/90444 A1 | 11/2001 |
| WO | 2005/035841 A2 | 4/2005 |
| WO | 2007/024245 A1 | 3/2007 |
| WO | 2007/024245 A2 | 11/2007 |
| WO | 2008/051219 A | 5/2008 |
| WO | 2008/113133 | 9/2008 |

OTHER PUBLICATIONS

International Search Report and Written Opinion of the International Search Authority dated Mar. 24, 2010, received in connection with International Application No. PCT/US2009/064992 filed Nov. 18, 2009.

* cited by examiner

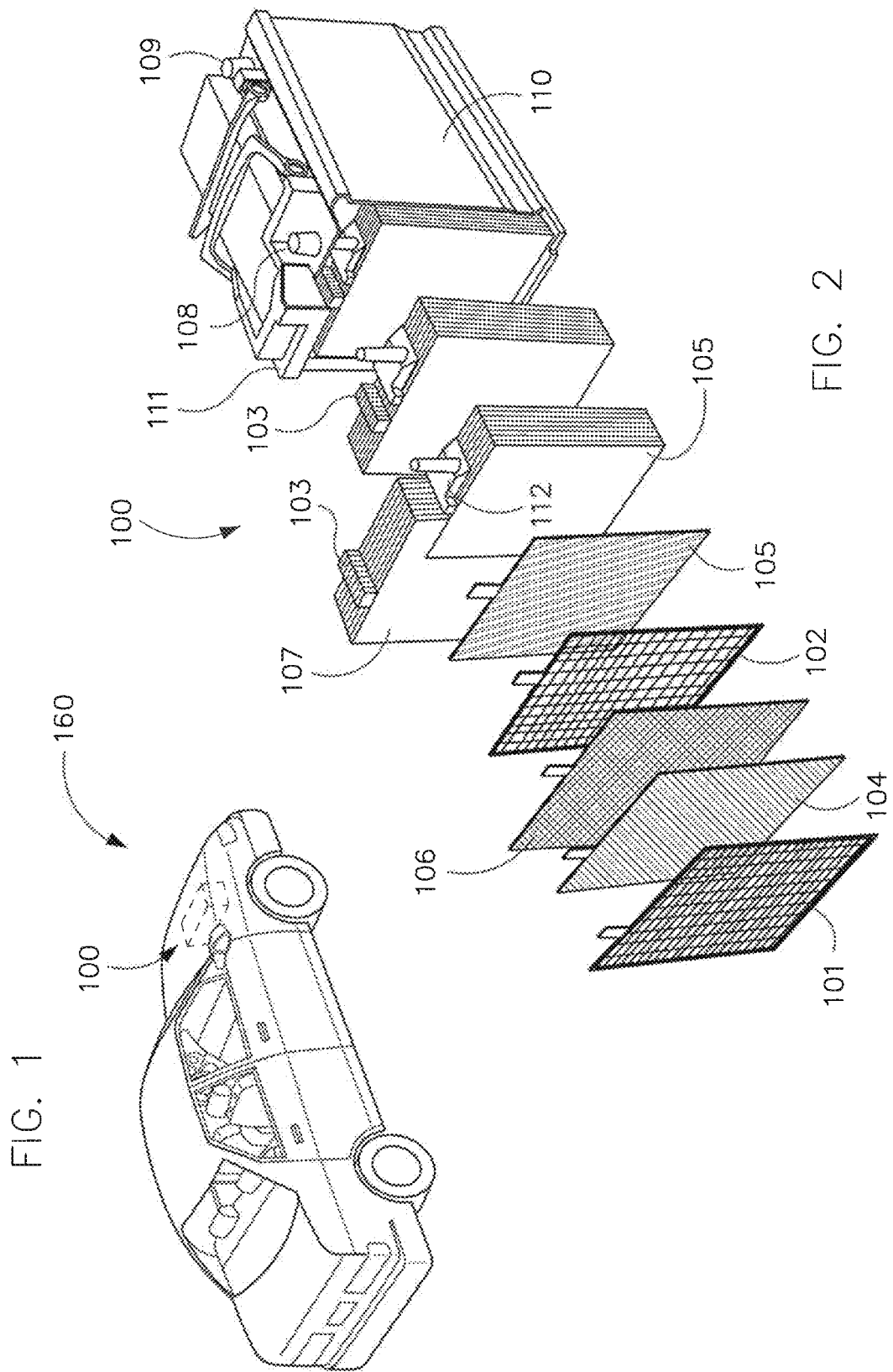

FIG. 7
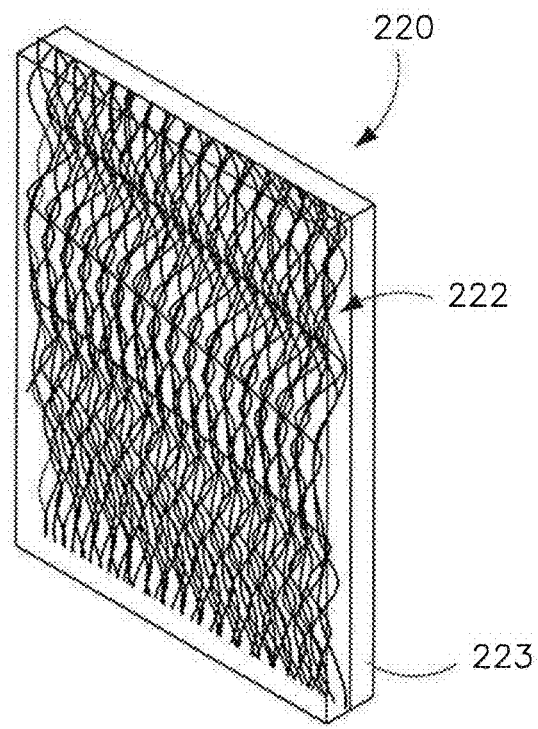
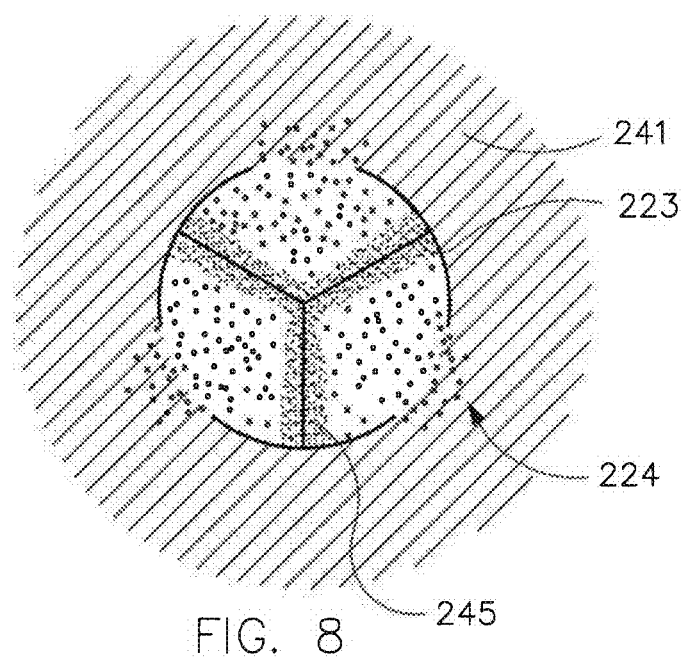
FIG. 8

FIG. 9
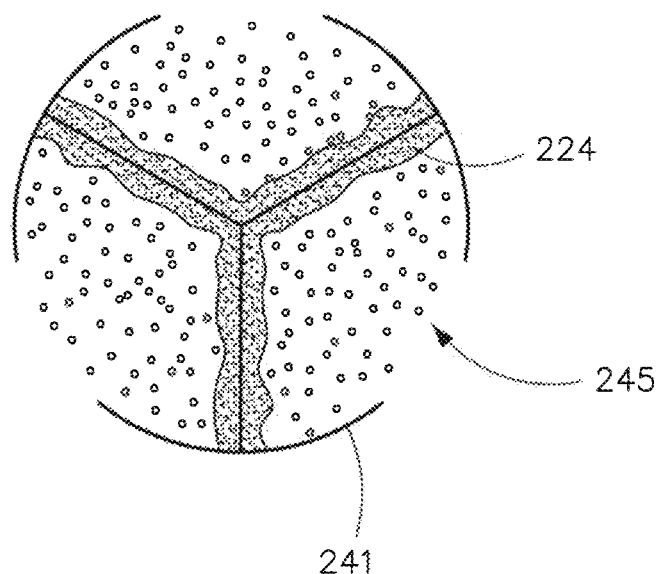
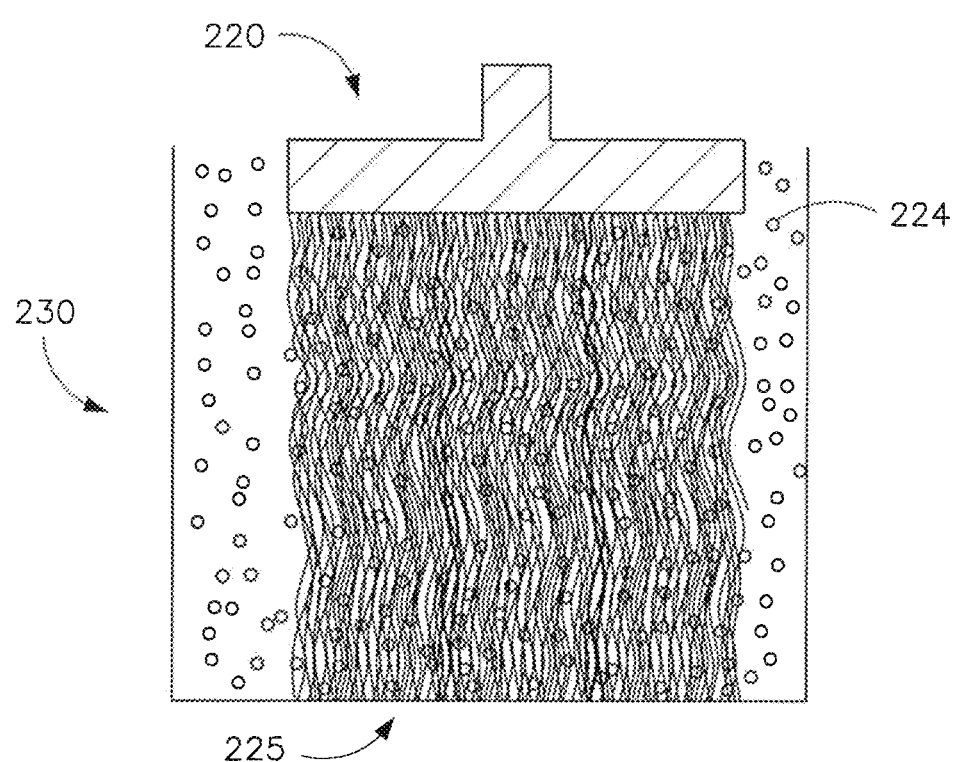
FIG. 10

ELECTRICAL POWER STORAGE DEVICES

PRIORITY

This application claims priority to U.S. Provisional Application 61/115,815 filed Nov. 18, 2008, and U.S. Provisional Application 61/150,987 filed Feb. 9, 2009, both of which are incorporated herein by reference in their entirety.

BACKGROUND

1. Field of the Invention

This invention relates to the use of fibers (e.g., wicking fibers) in electrochemical batteries, electrochemical double layer capacitors, and asymmetrical capacitors.

2. Related Art

It is known to provide electrical power storage devices, such as electrochemical batteries and capacitors, for use in vehicles such as automobiles. For example, lead-acid batteries have been used in starting, lighting, and ignition ("SLI") applications.

Two of the most common electrical power storage devices are batteries and capacitors. Conventional lead-acid batteries electrodes are formed by creating a lead paste that is applied to a substrate (e.g., a grid, plate, or screen) that may also act as a charge collector. As the lead paste dries, open pores are formed within the lead paste where battery electrolyte may enter increasing the reactive area of the grid and increasing its charge capacity. However, excessive porosity reduces the electrode's structural integrity. In addition, because conventional electrodes have limited porosity, a significant amount of active material is inaccessible to the electrolyte and is underutilized or essentially wasted because it is not available for reaction. Typically, about half of the lead in conventional lead-acid electrodes is unusable or goes unused. Over its life, a battery may be charged and discharged multiple times, which can also degrade the electrode as the reduction-oxidation reactions that supply current are repeatedly reversed. Over time, sections of the electrode can become electrically disconnected from the rest of the electrode. The electrode's structural integrity also deteriorates over time. To hold the electrode material in place, a scrim layer (e.g., a fiber mesh) may be used. The scrim layer mat may be placed on the charge collector prior to applying the active material paste and/or placed over the paste after it is applied. The scrim layer may help hold the electrode together, but it does not improve porosity or increase reactivity.

Capacitors store power in the form of an electric field between two conductors. Typical capacitors use stacks of thin plates (alternating capacitor plates and dielectric) or rolls of thin sheets (alternating capacitor and dielectric sheets rolled together). Energy is commonly stored on adjacent plates or sheets, separated by dielectric material, in the form of electrical charges of equal magnitude and opposite polarity. In typical capacitors, current flows from the capacitor surface throughout the entire capacitor plate, requiring the plates to be conductive to reduce resistance loss and to be sufficiently thick to not overheat and melt. Such requirements impose undesirable limits on the capacitor's power storage to weight ratio. Capacitance (i.e., the amount of charge stored on each plate) is proportional to plate surface area and inversely proportional to the distance between plates. Thus, increasing a capacitor's ability to store energy often requires increasing plate size and/or decreasing the distance between the plates. However, increasing the plate size increases resistance and overheating problems and decreasing plate separation increases the risk of charge passing directly between the plates (i.e., a short circuit), burning them out and rendering the capacitor incapable of holding a charge.

Electrochemical double layer capacitors ("EDLC") are power storage devices capable of storing more energy per unit weight and unit volume than traditional electrostatic capacitors. Moreover, EDLC can typically deliver stored energy at a higher power rating than conventional rechargeable batteries. Conventional EDLC use carbon as the active material in the electrodes. Conventional EDLC consist of two porous electrodes that are isolated from electrical contact by a porous separator. Both the separator and electrodes are infused with an electrolytic solution. This allows ionic current to flow between the electrodes through the separator, but prevents electrical current from shorting the cell. A current collecting grid is coupled to the back of each of the electrodes. EDLC store electrostatic energy in a polarized liquid layer that forms when a potential exists between two electrodes immersed in an electrolyte. When electrical potential is applied across the electrodes, a double layer of positive and negative charges is formed at the electrode-electrolyte interface by polarization of the electrolyte ions due to charge separation under the applied electric field, and also due to the dipole orientation and alignment of electrolyte molecules over the entire surface of the electrodes. No reduction-oxidation reactions are involved in the charge storage mechanism.

Asymmetric electrochemical capacitors use a battery electrode for one of the electrodes. The battery electrode has a large capacity in comparison to the carbon electrode, so that its voltage does not change significantly with charge. This allows a higher overall cell voltage. Examples of asymmetrical capacitors materials include $PbO_2$ with carbon and NiOOH with carbon.

OUTLINE OF BASIC AND OTHER ADVANTAGEOUS FEATURES

There remains a significant need for electrical power storage devices that have greater power storage capacity, reduced weight, and/or improved cyclability. It would be desirable to provide a power storage device, such as, for example, a battery, a capacitor, an asymmetrical capacitor, or the like of a type disclosed in the present application that includes any one or more of these or other advantageous features:

1. An electrode for a power storage device with increased permeability without reduced structural integrity;
2. An electrode for a power storage device with increased structural integrity without reducing permeability;
3. A power storage device that uses less active material without reduced power capacity;
4. A power storage device that includes electrodes that store energy as both an electrochemical battery and a capacitor;
5. A power storage device with a higher power to size ratio than conventional power storage devices;

SUMMARY

An exemplary embodiment relates to a power storage device comprising at least one positive electrode, at least one negative electrode, and at least one separator separating a positive electrode from a negative electrode, wherein the at least one of the at least one negative electrode or at least one positive electrode includes high surface area fibers.

Another exemplary embodiment relates to an electrode comprising a charge collector grid, electrode active material coated on the charge collector grid, and high surface area fibers.

Another exemplary embodiment relates to an electrode comprising a charge collector comprising a mat of high surface area fibers and electrode active material coated on the mat.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein:

FIG. 1 is a perspective view of a vehicle including a battery module according to an exemplary embodiment;

FIG. 2 is a cut-away exploded view of a battery module according to an exemplary embodiment;

FIG. 7 is a partial perspective view of an electrode with a mat of wicking fibers according to a first exemplary embodiment;

FIG. 8 is a cross-sectional view of a trilobal fiber loaded with carbon and electrolyte and coated in battery electrode active material according to a second exemplary embodiment;

FIG. 9 is a cross-sectional view of a fiber with electrode active material coated on the interior of the fiber and permeated with electrolyte according to an exemplary embodiment;

FIG. 10 is a front view of a dual electrochemical battery and EDLC using fibers according to the embodiment of FIG. 9 according to an exemplary embodiment;

Figure 3:
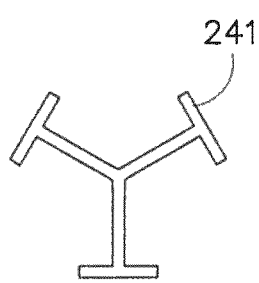
FIG. 3 is a cross-sectional view of an exemplary embodiment of a trilobal fiber according to this invention.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to FIG. 1, a vehicle 160 is shown that includes an electrical power storage device 100 according to an exemplary embodiment. While vehicle 160 is shown as an automobile, according to various alternative embodiments, the vehicle may include any variety of types of vehicles including, among others, motorcycles, buses, recreational vehicles, boats, and the like. According to an exemplary embodiment, vehicle 160 uses an internal combustion engine (not shown) for locomotive purposes.

Electrical power storage device 100 shown in FIG. 1 is configured to provide at least a portion of the power required to start or operate vehicle 160 and/or various vehicle systems (e.g., starting, lighting, and ignition systems ("SLI")). Further, it should be understood that electrical power storage device 100 may be utilized in a variety of applications not involving a vehicle, and all such applications are intended to be within the scope of the present disclosure.

Electrical power storage device 100, according to an exemplary embodiment, is illustrated in FIG. 2. In various embodiments, electrical power storage device 100 includes several cell elements which are provided in separate compartments of a container or housing 110 containing electrolyte. The embodiment of FIG. 2 relates to automotive applications, wherein groups of 12-16 plates 104 and 105 are used in each of six stacks 107 for producing a standard automotive 12-volt battery. It will be apparent to those skilled in the art, after reading this specification, that the size and number of the individual plates 104 and 105, the size and number of plates 104 and 105 in any particular stack 107, and the number of stacks 107 used to construct electrical power storage device 100 may vary widely depending upon the desired end use.

In various embodiments, housing 110 includes a box-like base or container and is made at least in part of a moldable resin. A plurality of stacks 107 or plate blocks are connected in series according to the capacity of the electrical power storage device and are accommodated in the container or housing 110 together with the electrolyte, which is commonly aqueous sulfuric acid.

In various embodiments, electrical power storage device 100 includes a compartment having a front wall, end walls, a rear wall, and a bottom wall. In various embodiments, five cell partitions or dividers are provided between the end walls, resulting in the formation of six compartments, as typically would be present in a twelve-volt automotive battery. In other embodiments, the number of partitions and compartments may be varied to create electrical power storage devices with different voltages. In various embodiments, a plate block or stack 107 is located in each compartment, each plate block or stack 107 including one or more positive plates 104 and negative plates 105, each having at least one lug 103, and a separator 106 placed or provided between each positive plate 104 and negative plate 105. In various exemplary embodiments, the positive plates 104 and negative plates 105 include a grid 101 and 102 with an attached lug 103 that are coated with positive or negative electrode active material or paste, respectively.

Cover 111 is provided for housing 110, and in various embodiments, cover 111 includes terminal bushings and fill tubes to allow electrolyte to be added to the cells and to permit servicing. To prevent undesirable spillage of electrolyte from the fill tubes, and to permit exhausting of gases generated during the electrochemical reaction, the electrical power storage device may also include one or more filler hole caps and/or vent cap assemblies.

At least one positive terminal post 108 and negative terminal post 109 may be found on or about the top or front compartments of the electrical power storage device. Such terminal posts 108 and 109 typically include portions which may extend through cover 111 and/or the front of housing 110, depending upon the electrical power storage device design. In various embodiments, terminal posts 108 and 109 also extend through a terminal post seal assembly (not shown) to help prevent leakage of acid. It will be recognized that a variety of terminal arrangements are possible, including top, side, or corner configurations known in the art.

FIG. 2 also shows a conventional cast-on strap 112 which includes a rectangular, elongated body portion of a length sufficient to electrically couple each lug in a plate set and an upwardly extending member having a rounded top. FIG. 2 also illustrates a cast-on strap coupling lugs to be coupled to negative terminal post. As shown in FIG. 2, according to various embodiments, the cast-on strap includes a body portion coupling the respective lugs in the end compartments and a post formed therewith to protrude through a cover.

Each cell element or chapter includes at least one positive plate 104, at least one negative plate 105, and a separator 106 positioned between each positive plate 104 and negative plate 105. Separators 106 are provided between the plates to prevent shorting and undesirable electron flow produced during the reaction occurring in electrical power storage device 100.

As discussed above, the reactivity of a conventional battery plate or electrode increases as the porosity (related to the amount of void space) of the plate or electrode increases. However, a conventional electrode's structural integrity or strength and internal conductivity decrease as porosity increases. In addition, a conventional electrode's structural strength and internal conductivity tend to deteriorate over time as the battery is discharged and recharged.

The plates or electrodes described herein have greater porosity and/or structural integrity than conventional electrodes. In various exemplary embodiments, small high surface area fibers (e.g., shaped fibers and/or microfibers) with the ability to wick electrolyte solutions are incorporated into or otherwise utilized in connection with various components or parts of the electrodes. The high surface area fibers may strengthen the electrode and/or create paths for the electrolyte to better penetrate the electrode active material. The resulting electrodes require less active material to produce the same current and retain their charge capacity through more discharge-recharge cycles than conventional electrodes. They also better maintain their structural integrity and/or internal conductivity. In various exemplary embodiments, non-wicking conductive fibers may also be used to strengthen the electrode active material and increase internal electrode conductivity.

In various exemplary embodiments, the disclosed electrodes are also usable in electrochemical double layer capacitors ("EDLC"). Capacitance is enhanced by the inclusion of carbon in various forms, including, for example, graphite, expanded graphite, activated carbon, carbon black, carbon nanofibers, and carbon nanotubes ("CNT") or any combination of these materials. The carbon may be provided (e.g., coated or impregnated) in the wicking fibers and/or mixed with the active material. The addition of carbon to the fibers helps increase their effective surface area and their conductivity. Conductive fibers help prevent portions of the electrode from becoming electrically isolated (e.g., by physical and/or conductive disconnection of portions of the electrode and/or by formation of poor conductors in the electrode). It should be understood that the term "electrode" as used herein refers to a device used to store electrical charge in an electrochemical battery cell, an EDLC, and/or an asymmetrical capacitor (e.g., a dual battery/EDLC).

In various exemplary embodiments, the disclosed power storage devices comprise asymmetrical capacitors. An asymmetrical capacitor is an electrochemical capacitor where one of the plates is substituted with a battery electrode. In various exemplary embodiments, electrodes in the disclosed power storage devices store electrical charge simultaneously as both an electrochemical battery electrode and an electrochemical capacitor electrode.

Figure 4:
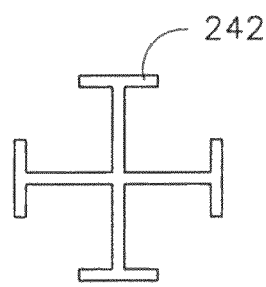
FIG. 4 is a cross-sectional view of a quadrilobal fiber according to an exemplary embodiment.
Figure 5:
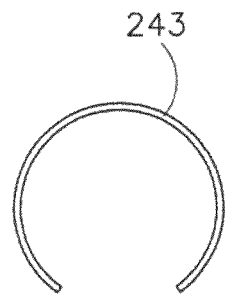
FIG. 5 is a cross-sectional view of a circular fiber according to an exemplary embodiment.

By way of example, FIGS. 3-5 illustrate three shaped fibers within the scope of this invention. FIG. 3 illustrates one exemplary embodiment of a trilobal fiber 241. FIG. 4 illustrates one exemplary embodiment of a quadrilobal fiber 242. FIG. 5 illustrates one exemplary embodiment of a circular fiber 243. These and other shapes have the ability to retain material coated therein without the use of or need for adhesives. Other fiber shapes now known or later developed may also be used.

In various exemplary embodiments, the fibers have a cross-sectional diameter from about 1 micron to about 100 microns and 0.02-20 mm in lengths, depending on the processing method. The manufacture of wicking fibers with high surface area to volume ratios is known. For example, Largman et al. (U.S. Pat. No. 5,057,368) addresses the manufacture of trilobal and quadrilobal fibers, the entire disclosure of which is incorporated herein by reference.

Individual fibers may be straight or non-straight. Non-straight fibers may have one or more shapes including, but not limited to, for example, a coiled fiber, looped fiber, a crimped fiber, and an air entangled fiber. These are offered by way of example, and individual fibers may have sections with one or more of these or other forms.

In various exemplary embodiments, the fibers are formed from a polymer (e.g., polyester, polypropylene, polyethylene, and/or polyethylene terephthalate). Additional materials (e.g., carbons, metals, and metal oxides) may be utilized with the polymer prior to or after fiber formation. The fibers may be formed of various organic and/or inorganic materials, including, for example, polypropylene, polyethylene, polyethylene terephthalate (PET), and/or glass. The fibers may also be made of conductive polymers (e.g., redox polymers) which can act as a type I, II, or III capacitor depending on their configuration. The choice of materials may be affected by the environment in which they will be placed or utilized (e.g., materials that resist the corrosive effects of the acids used in a cell). The fibers may be formed in a single step or multiple steps to provide different layers of materials with varying mechanical, chemical, electrical characteristics, and/or "fluid" transport properties. The wicking behavior of the fiber may be adjusted or altered by the choice of a hydrophobic or hydrophilic fiber material.

In various exemplary embodiments, the fibers may be used "as is," carbonized, and/or pre-loaded with engineered materials (e.g., metals, carbon black, silica, tin oxide, graphite, and/or acid). In various exemplary embodiments, the fibers are pre-treated utilizing various methods and/or means. The pre-loaded materials may include nano-scale materials such as, for example, nano-fibers and multi-walled nanotubes. A coating may be applied by any suitable means, such as, for example, deposition via a solvent both in dispersion and slurry form (e.g., by water, acid, or other solvent), by spraying, or by immersing the fiber (e.g., in a conductive metal). For example, many of the materials from which the fibers may be formed have a higher melting point than lead-based electrode active materials. Thus, lead-based active material may be applied to the fibers by dipping the fibers in molten active material and allowing the active material to stiffen, solidify, and/or otherwise form on the fiber.

In various exemplary embodiments, an EDLC is integrated with an electrochemical battery (e.g., lead-acid or lithium ion batteries). In various embodiments, the battery electrodes also function as EDLC electrodes. The electrodes may include both battery electrode active material and carbon. In various embodiments, the electrolyte contains sufficient ions to react chemically with the battery active material and to form EDLC charged layers.

The fibers may be constructed of various materials, including conductive materials and/or dielectric materials. In various embodiments, fibers are made from two or more materials (e.g., a conductive core and a dielectric surface). The fibers may be conductive in their core or internally (e.g., in their interiors) and dielectric on their surface or externally, which would allow the cores to be or act as current collectors for the capacitors formed by the dielectric material. This may be accomplished at least in part by, for example, coextruding the fibers or by coating a conductive fiber with dielectric.

Figure 6:
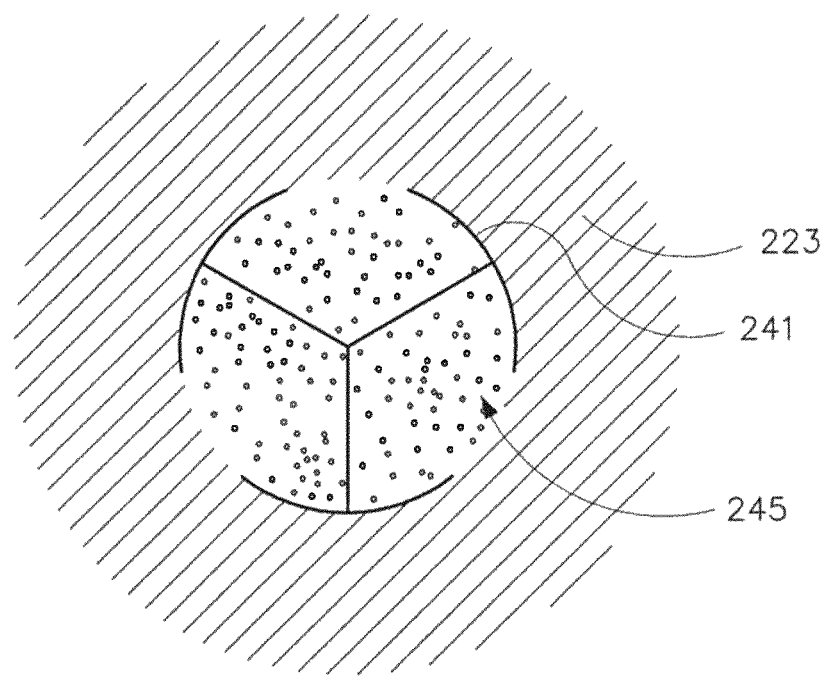
FIG. 6 is a cross-sectional view of a trilobal fiber loaded with carbon and coated with battery electrode active material according to an exemplary embodiment.

In various exemplary embodiments, as shown in FIG. 6, an exemplary trilobal fiber 341 that is coated or loaded with carbon additive 246 (e.g., graphite, expanded graphite, activated carbon, carbon black, carbon nanofibers, and/or CNT). Carbon materials may be loaded into or onto areas of the fiber in their native form (i.e., without any binder materials) or in a composite form where a known quantity of binder is added to the carbon to form a stable porous composite (e.g., within the fiber). CNTs, carbon nanofibers, and carbon whiskers may be grown on a variety of substrates. One method of accomplishing this is disclosed in International Patent Application No. PCT/US2007/011577, which is incorporated herein by reference in its entirety.

In various exemplary embodiments, as shown in FIG. 6, fiber 341 (e.g., interior surfaces) is coated with carbon and surrounded by electrode active material (e.g., coated on the fiber or mixed with the fibers).

In various exemplary embodiments, as shown by FIG. 7, the wicking fibers are provided or otherwise formed into a mat 222 (e.g., woven, non-woven, or point bonded). In various embodiments, active material 223 (e.g., lead oxide) is provided (e.g., coated) on the mat 222 to form an electrode 220 for an electrical power storage device (e.g., an electrochemical battery). In various embodiments, as shown in FIG. 6, the fibers may also be coated with carbon (e.g., graphite, expanded graphite, activated carbon, carbon black, carbon nanofibers, and/or CNT) and, in some embodiments, function as an EDLC. Such embodiments may help to increase life cycle, create a high interfacial area thereby increasing the double layer capacitance for the active electrode, help optimize charge acceptance and/or high-rate discharge, and/or improve conversion efficiency of active material (e.g., on initial charge).

In various alternative embodiments, short pieces of fibers are interspersed, mixed, or otherwise provided with the active material, in addition to or in place of the longer fibers shown in FIG. 7. The mixture of short fiber pieces and active material may be provided (e.g., coated) on a conventional charge collector (e.g., a grid, plate, or screen) or on a fiber mat. In various exemplary embodiments, short lengths of fiber may be adhered to the surface of the charge collector to help form a flocking structure to support the active material. The inclusion of the short fiber pieces in the active material helps increase the electrode's porosity and/or reactivity, which helps reduce the amount of active material required to form an electrode. If the fiber pieces are coated in carbon, the resulting plate may also function as an EDLC.

In various exemplary embodiments, a scrim layer (not shown) including a fiber mesh is included in an electrode. A scrim layer may be included between the active material and the charge collector and/or over or embedded at least partially in the active material. In various embodiments, the scrim layer is formed of wicking fibers of the types discussed above. The fibers comprising the scrim layer may be pre-loaded with materials, such as, for example, electrode active material, carbon (e.g., graphite, expanded graphite, activated carbon, carbon black, carbon nanofibers, and/or CNT), silica, and/or acid. In various exemplary embodiments, the scrim layer is formed from and/or coated or impregnated with carbon to help improve capacitance and conductivity (e.g., in sponge lead and carbon capacitor electrodes). In other embodiments, the scrim layer is coated or impregnated with carbon and lead oxide to form a dual electrochemical battery electrode and EDLC. The scrim layer may be formed of a woven or non-woven mesh in a variety of patterns to adjust the ability of the scrim to adhere to and/or support the active material. In various exemplary embodiments, a scrim layer may be utilized as or as part of the collector grid with the fibers coupled or connected directly to or otherwise forming or helping form the plate connector.

FIG. 8 illustrates a cross-section of an exemplary fiber 241 at least partially provided (e.g., coated) with carbon 245 (e.g., graphite, expanded graphite, activated carbon, carbon black, carbon nanofibers, or CNT) and electrolyte 224 on at least some of its surfaces (e.g., interior surfaces). In various embodiments, the fibers 241 are also impregnated with electrolyte and at least partially surrounded by electrode active material 223. In various embodiments, the average distance between shaped fibers 241 is approximately half the thickness of the battery electrode. However, other spacing may be utilized.

According to various exemplary embodiments, a battery cell includes an electrode with wicking fibers (e.g., high surface area fibers) extending into and/or through the electrode. In various exemplary embodiments, the wicking fibers help draw the electrolyte into the electrode (e.g., to the electrode's interior) to help improve porosity, increasing the electrode's effective surface area. In various exemplary embodiments, the fibers also help maintain the electrode's structural integrity by functioning as pasting or reinforcing fibers (e.g., against structural degradation caused by battery cycling).

According to various exemplary embodiments, a battery cell 230 includes an array 225 of wicking fibers (a cross-section of one exemplary fibers is shown in FIG. 9) loaded with electrode active material (e.g., a lead-based paste). In various embodiments, the fiber array 225 is substantially immersed in the electrolyte 224 solution. The fiber arrays 225 may be in any form (e.g., loose fibers, woven or non-woven mats, bundles, etc.). In various embodiments, such as shown in FIG. 10, the fiber arrays 225 may act as current collectors for the electrodes, with some loaded with anode active material and others with cathode active material. In various exemplary embodiments, electrodes made with such fibers may help reduce the amount of lead required, shorten or eliminate the drying process, do not require adhesives, and/or increase conductivity.

According to various exemplary embodiments, carbon (e.g., graphite, expanded graphite, activated carbon, carbon black, carbon nanofibers, and/or CNT) may be added to the fibers in any of the various embodiments shown to obtain EDLC effect from the fiber. The carbon additive helps create a carbon-electrolyte interface for an EDLC. In various exemplary embodiments, the addition of CNT to the fibers also increases electrical conductivity along the fibers. In various exemplary embodiments, the fibers contain carbon and are part of an electrochemical battery electrode to form an asymmetrical capacitor.

Figure 11A:
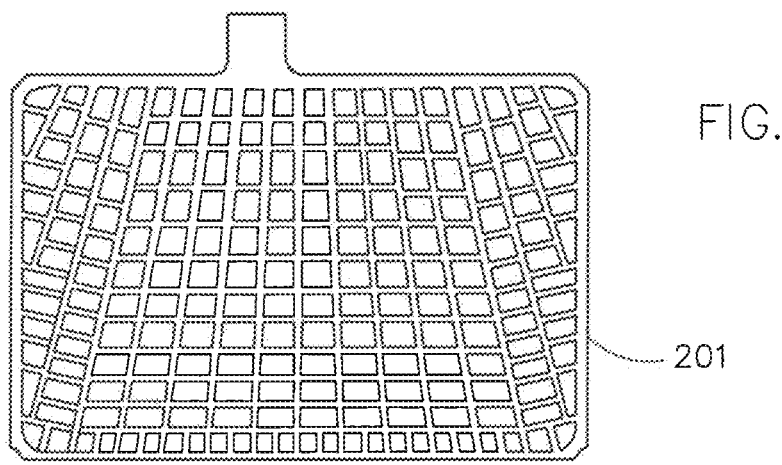
FIG. 11A is a front view of a battery grid according to an exemplary embodiment.
Figure 11B:
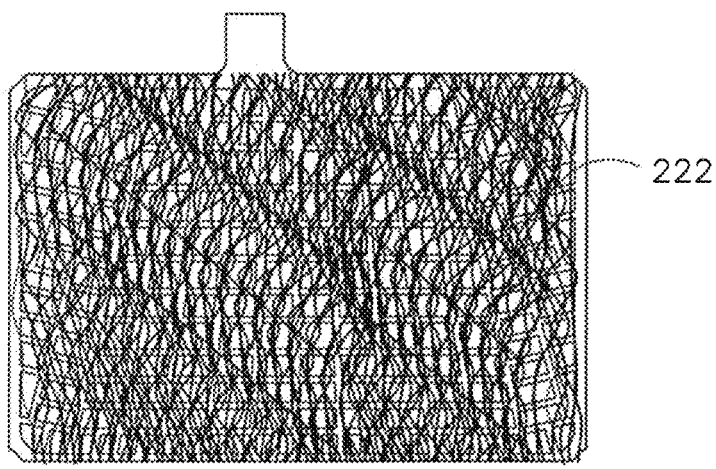
FIG. 11B is a front view of the battery grid of FIG. 11A covered by high surface area fibers according to an exemplary embodiment.
Figure 11C:
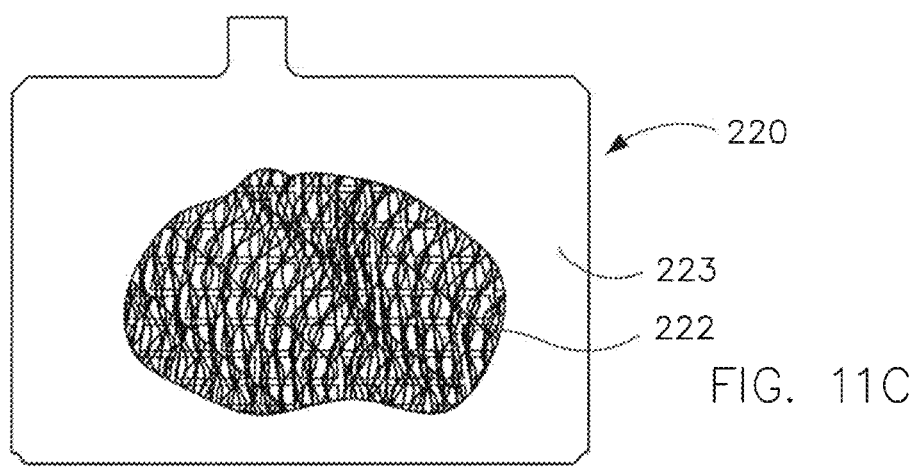
FIG. 11C is a front view of the battery grid of FIG. 11B covered by electrode active material according to an exemplary embodiment.

According to various exemplary embodiments, the construction of an electrode is illustrated in FIGS. 11A-11C. In various embodiments, wicking fibers are provided (e.g., loaded) with electrode active material. A carbon additive may also be loaded on the fibers. The fibers may also be at least partially sheathed with battery separator. In various exemplary embodiments, shown in FIG. 11A, a charge collector 201 (e.g., a grid, plate, or screen) is provided. The charge collector is at least partially provided or coated with electrode fibers 222, as further illustrated in FIG. 11B. The fibers may be provided on one or both sides of the charge collector and/or coupled to a terminal. In various embodiments, as shown in FIG. 11C, the fibers 222 are at least partially provided with electrode active material 223 on their exterior surfaces (e.g., exterior electrode active material may be opposite in polarity to that loaded in the fibers' interior), which is in contact with the charge collector. The charge collector shown is a positive collector in the form of a lead grid or screen, but it could be any charge collector or substrate. In some embodiments, the charge collector is a mat made at least in part of conductive wicking fibers. Any appropriate or suitable separator material potentially may be used. In various exemplary embodiments, the active material provided on the interior of the fibers is not the same as that coated on the outside (e.g., cathode versus anode active material).

In various alternative embodiments, short fiber pieces may be provided on one or more battery grids in addition to or in place of the long fibers shown in FIGS. 11B and 11C. In various embodiments, the fibers are provided or applied in a "floating structure" that may be utilized to help support the active material.

Figure 12A:
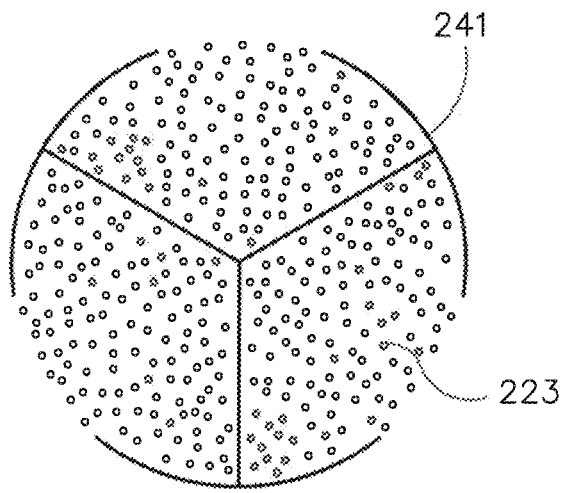
FIG. 12A is a cross-sectional view of a shaped fiber coated with electrode active material according to an exemplary embodiment.
Figure 12B:
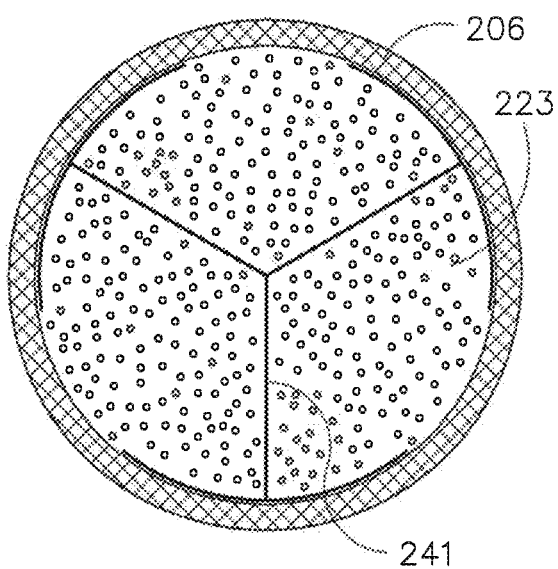
FIG. 12B is a cross-sectional view of the fiber of FIG. 12A coated with a permeable insulator according to an exemplary embodiment.
Figure 12C:
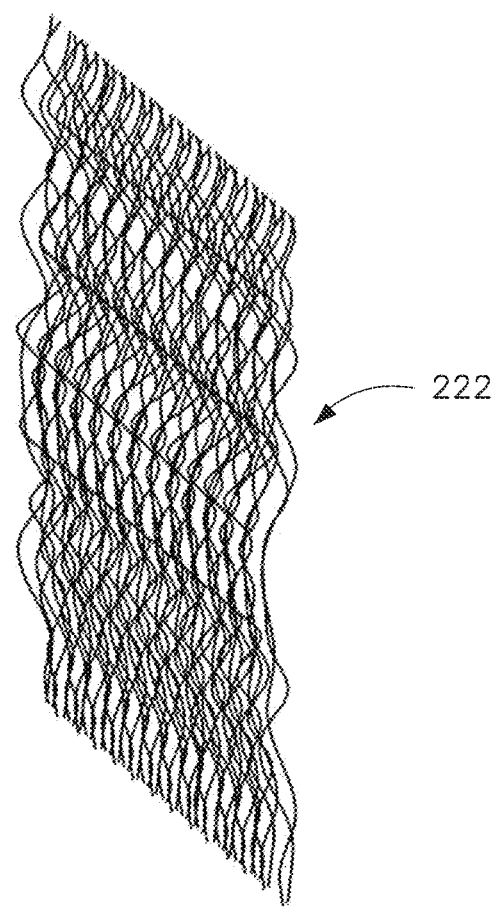
FIG. 12C is a perspective view of a mat made of the fibers of FIG. 12B according to an exemplary embodiment.

According to various exemplary embodiments, as illustrated in FIG. 12A, a battery cell includes wicking fibers 241 coated with anode or cathode active material 223. As shown in FIG. 12B, the fibers 241 are at least partially insulated with a sheath or jacket 206 of battery separator. In various exemplary embodiments, as shown in FIG. 12C, the fibers 241 are formed into a mat 222 (e.g., woven or non-woven) including an approximately equal or similar amount of anode and cathode. In other exemplary embodiments, battery cells may be formed with separate anode-only mats and cathode-only mats.

According to some exemplary embodiments, the electrode active material paste is provided (e.g., mixed) with carbon such as, for example, graphite, expanded graphite, activated carbon, carbon black, carbon nanofibers, CNT, or graphite coated CNT, to help create a matrix of carbon within the electrode. Carbon fibers may be provided to, for example, increase the structural strength of the electrode active material, the electrode's porosity, and/or the electrode's ability to function as an EDLC. According to various exemplary embodiments, an electrode is manufactured by producing a master-batch of carbon nanofibers or CNT (single or multi-walled) and water (e.g., an ultrasonic dispersion) or lead power (e.g., dispersed by extruder), and providing (e.g., mixing or blending) the master-batch with electrode active material to form an electrode active material mixture paste. In various embodiments, the paste is applied or otherwise provided onto at least a portion of an electrode substrate and dried and/or allowed to dry to form an electrode plate. This may be accomplished by a variety of methods including, for example, rolling the mixture onto the substrate. In various exemplary embodiments, the carbon is substantially uniformly dispersed throughout the electrode. The carbon fibers may be of various dimensions and used in various concentrations (e.g., about 0.05 to 5% of the electrode mixture by weight). In various exemplary embodiments, the addition of carbon fibers increases capacitance as an EDLC without reducing its electrochemical battery capacity. In various exemplary embodiments, the carbon fibers also improve the structural integrity of the electrode.

In various embodiments, the fibers may be made of conducting or conductive polymers which can undergo electrochemical doping (e.g., P-doping or N-doping), thereby functioning as an electrolytic capacitor. In various embodiments, both types of electrodes (e.g., anodes and cathodes) maybe constructed of the same material capable of undergoing either P-doping or N-doping (e.g., type III) to thereby function as an electrolytic capacitor. In various embodiments, a scrim mat, formed at least in part from fibers made of conducting polymers, may be added to the electrode to provide a EDLC functionality.

In various exemplary embodiments, a power storage device is formed using microfibers. For purposes of this disclosure, a "microfiber" is any fiber with a denier per filament ("dpf") of about 1.5 or less. Fibers of this kind are also sometimes referred to as "microdenier". The microfibers may have any cross-sectional shape, including round. Microfibers may be used in any of the embodiments described above in addition to or in place of the shaped fibers. Microfibers are particularly effective at wicking liquids because of their large surface areas relative to their volume. Microfibers may be made of a polymer (e.g., polyester, polypropylene, polyethylene, and/or polyethylene terephthalate).

The use of microfibers in textiles is known. For example, exemplary microfibers are disclosed in U.S. Pat. Nos. 6,627,025, 7,160,612, and 7,431,869 and in John F. Hagewood, Ultra Microfibers: Beyond Evolution, http://www.hillsinc.net/Ultrabeyond.shtml, all of which are incorporated herein by reference in their entirety. Microfibers of these types may be used in the disclosed power storage devices whether or not formed into a fabric or mat.

Figure 13:
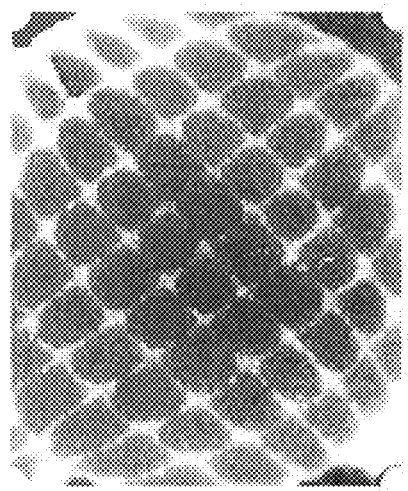
FIG. 13 is an end view of bicomponent filament according to a first exemplary embodiment.
Figure 14:
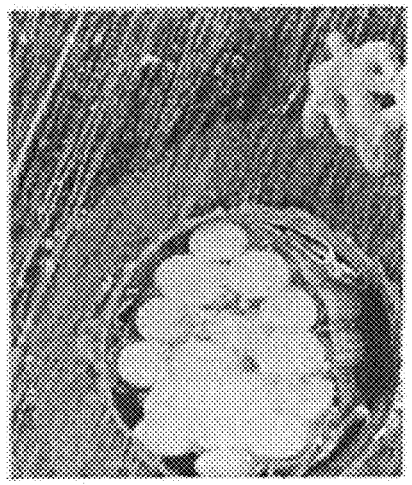
FIG. 14 is a perspective view of a bicomponent filament according to a second exemplary embodiment.

In some exemplary embodiments, microfibers are formed by spinning and processing bicomponent filaments in the range of 2-4 dpf, after which the filaments are split into microfibers with a dpf of 0.1 or lower. FIG. 13 shows a bicomponent filament with a dpf of approximately 3. There are 64 microfibers of a first component in a matrix of a second component. In this embodiment, the bicomponent filament is approximately 80% microfiber and 20% matrix. Because the bicomponent filament's dpf is 3, the spinning may be the same as for a standard homopolymer fiber. The microfibers are separated from the matrix component by dissolving out the matrix component, which process may be performed either before or after the filaments and/or microfibers are formed into a mat or other power storage device structure. FIG. 14 shows a bicomponent filament with 1120 microfibers per filament, part of which is separated into microfibers, formed using the above-described technique of dissolving out a matrix component.

Figure 15:
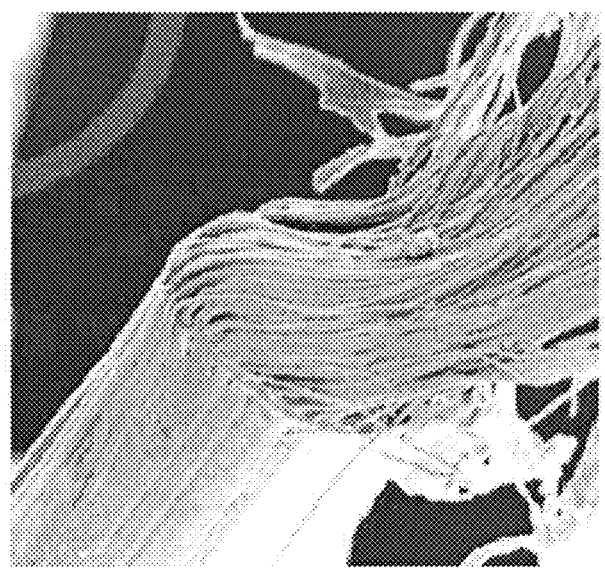
FIG. 15 is a perspective view of a bicomponent filament according to a third exemplary embodiment.

In various exemplary embodiments, microfibers are formed by spinning 2-4 dpf bicomponent yarn filaments, which spinning may be done using conventional techniques. In various exemplary embodiments, a mild caustic is applied to the yarn causing individual microfibers to separate from the bicomponent yarn filament. FIG. 15 shows microfibers made according to this technique with a dpf of about 0.1.

Figure 16:
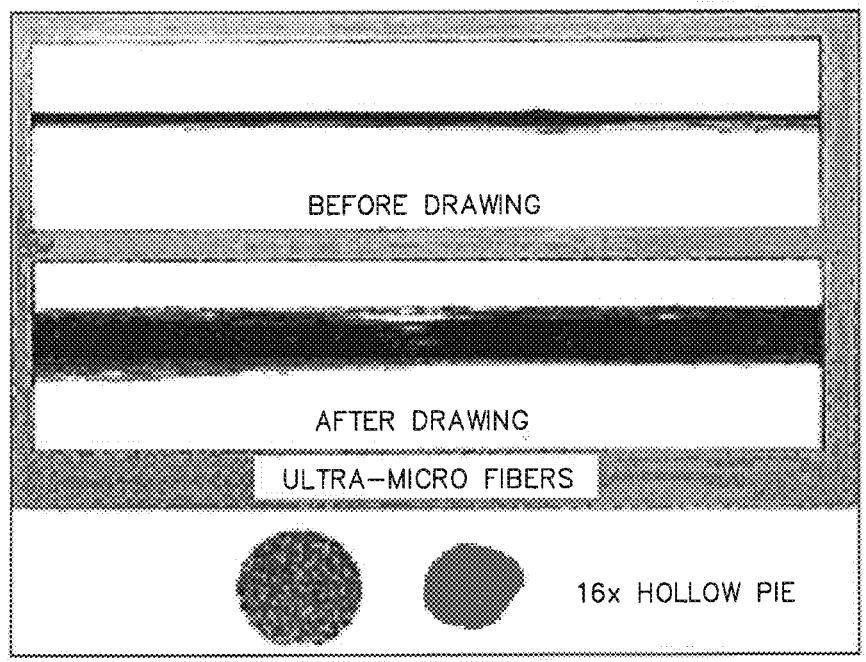
FIG. 16 is a side view of a bicomponent filament according to a fourth exemplary embodiment.

In some exemplary embodiments, the yarn filaments are separated into microfibers without use of a caustic. Splittable, hollow fibers, such as those illustrated in FIG. 16, may be split without a caustic. In various exemplary embodiments, a polyester/polypropylene filament is spun and split afterward. FIG. 15 shows a filament with 198 3-dpf filaments prior to processing. In various exemplary embodiments, the filaments are mechanically drawn to produce 3,168 microfibers with a dpf of about 0.2.

Figure 17:
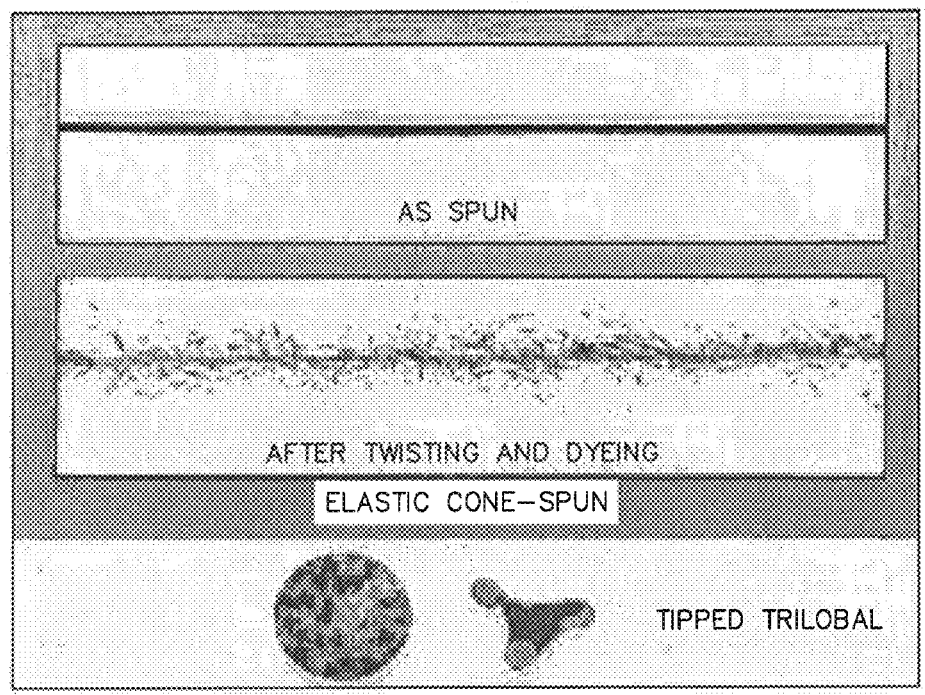
FIG. 17 is a side view of a bicomponent filament according to a fifth exemplary embodiment.

In various exemplary embodiments, and as shown in FIG. 17, microfibers are formed from a bicomponent filament with a first polymer core and a smaller quantity of a second polymer on the tips of a trilobal or delta cross-section filament. In the embodiment shown in FIG. 17, the core polymer is a melt-spinnable polyurethane and the tips are polypropylene. The ratio of the two polymers is approximately 70% polyurethane to 30% polypropylene. As shown, the filaments are made using standard fully oriented yarn spin/draw processes and has an approximate dpf of 3. After spinning, in various exemplary embodiments, the filaments are twisted and subject to wet heat to help produce a filament such as that shown in FIG. 17. The tips separate from the cores forming microfibers with a dpf of about 0.2 or less spiraled around the filament core. The filament core may also shrink during the heating process.

In various exemplary embodiments, the microfibers are used "as is", carbonized, and/or pre-coated with engineered materials (e.g., metals, carbon (e.g., graphite, expanded graphite, activated carbon, carbon black, carbon nanofibers, and/or CNT), silica, tin oxide, and/or acid). In various exemplary embodiments, the microfibers are pre-treated utilizing various methods or means. The pre-coated materials may include nano-scale materials such as, for example, nanofibers and nanotubes. A coating may be applied by deposition via a solvent both in dispersion and slurry form (e.g., by water, acid, or other solvent), by spraying, or by immersing the microfiber (e.g., in a conductive metal). For example, many of the materials from which the microfibers may be formed have a higher melting point than lead-based electrode active materials. Thus, lead-based active material may be applied to the microfibers by dipping the microfibers in molten active material and allowing the active material to stiffen, solidify, and/or otherwise form on the microfiber.

The microfibers may be constructed of various materials, including conductive materials and/or dielectric materials. In various embodiments, microfibers are made from two or more materials (e.g., a conductive core and a dielectric surface). The microfibers may be conductive in their core or internally and dielectric on their surface or externally, which would allow the cores to act as current collectors for the capacitors formed by the dielectric material. This may be accomplished at least in part by, for example, coating a conductive microfiber with dielectric.

In various exemplary embodiments, the microfibers are coated with carbon (e.g., graphite, expanded graphite, activated carbon, carbon black, carbon nanofibers, and/or CNT). Carbon materials may be coated or otherwise provided onto the microfiber in their native form (i.e., without any binder materials) or in a composite form where a known quantity of binder is added to the carbon to form a stable porous composite on the microfiber. CNTs, carbon nanofibers, and carbon whiskers may also be grown on a variety of microfiber substrates.

In various embodiments, microfiber segments (e.g., short microfiber pieces) are provided on one or more battery grids. In various embodiments, the microfibers so produced are applied in a "floating structure" that may be utilized to help support the active material.

In various exemplary embodiments, a battery electrode is formed using microfibers, wherein the microfibers are carbonized or graphitized and coated or otherwise provided with active material. In various embodiments, the microfiber is made from a polymer (e.g., a polyolefin). In various exemplary embodiments, metal particles (e.g., nickel, iron, cobalt, molybdenum) are provided (e.g., applied to its surfaces), which may be accomplished by any suitable means such as, for example, by spraying. In various embodiments, the metal particles are substrates or seeds onto which carbon fibers (e.g., CNT) may be formed or grown. In various exemplary embodiments, active material is provided or applied around the microfibers by, for example, pressing or rolling the active material around and/or through the carbon microfiber/nanotubes bundle. In various exemplary embodiments, the bundle is wetted with electrolyte solution. At any point in the process, the individual microfibers may be formed into bundles or mats, which may be woven or non-woven.

Individual microfibers may be straight or non-straight. In various exemplary embodiments, the microfibers may be coiled, looped, crimped, air entangled, or any combination of these and other shapes.

In various exemplary embodiments, the microfibers are provided or otherwise formed into a mat (e.g., woven, non-woven, or point bonded). In various embodiments, active material (e.g., lead oxide) is provided (e.g., coated) on the microfiber mat to form an electrode for an electrochemical battery. The microfibers may also be coated with carbon or nanotubes (and, in at least some embodiments, thereby function as an EDLC). Such embodiments may help to increase life cycle, create a high interfacial area thereby increasing the double layer capacitance for the active electrode, help optimize charge acceptance and/or high-rate discharge, and/or improve conversion efficiency of active material (e.g., on initial charge).

In various exemplary embodiments, pieces (e.g., short pieces) of microfibers are interspersed, mixed, or otherwise provided with the active material. The mixture of short microfiber pieces and active material may be provided (e.g., coated) on a conventional charge collector (e.g., a grid, plate, or screen) or on a fiber mat. In various exemplary embodiments, short lengths of microfiber may be adhered to the surface of the charge collector to form a flocking structure to support the active material. The inclusion of the short microfiber pieces in the active material helps increase the electrode's porosity and/or reactivity, which helps reduce the amount of active material required to form an electrode. If the microfiber pieces are coated in carbon, the electrodes may also be used in an EDLC.

In various exemplary embodiments, a scrim layer, including a microfiber mesh, is included in an electrode. A scrim layer may be included between the active material and the charge collector and/or over or embedded at least partially in the active material. In various embodiments, the scrim layer is formed of microfibers of the types discussed above. The microfibers comprising the scrim layer may be pre-coated with materials, such as, for example, active material, carbon, silica, graphite, and/or acid. In various exemplary embodiments, the scrim layer is formed from and/or coated or impregnated with carbon to help improve capacitance and conductivity (sponge lead and carbon capacitor electrodes). In other embodiments, the scrim layer is coated or impregnated with carbon and lead oxide to form a dual electrochemical battery electrode and EDLC. The scrim layer may be formed of a woven or non-woven mesh in a variety of patterns to adjust the ability of the scrim to adhere to and/or support the active material. In various exemplary embodiments, a scrim layer may be utilized as or as part of the collector grid with the microfibers coupled or connected directly to or otherwise forming or helping form the plate connector.

According to various exemplary embodiments, a battery cell includes an electrode with microfibers extending into and/or through the electrode. In various exemplary embodiments, the microfibers help draw the electrolyte into (e.g., to the electrode's interior) the electrode (e.g., active material) to help improve porosity, increasing the electrode's effective surface area. In various exemplary embodiments, the microfibers also help maintain the electrode's structural integrity by functioning as pasting or reinforcing fibers (e.g., as the battery is charged and discharged).

According to various exemplary embodiments, a battery cell includes an array of microfibers coated with active material (e.g., paste). In various embodiments, the microfibers are substantially immersed in the electrolyte solution. The microfiber arrays may be in any form (e.g., loose fibers, woven or non-woven mats, bundles, etc.). In various embodiments, the microfibers act as electrodes (e.g., conduct current), some microfiber arrays coated in anode active material and other microfiber arrays coated in cathode active material.

In various embodiments, the microfibers may be made of conducting or conductive polymers which can undergo electrochemical doping (e.g., P-doping or N-doping), thereby functioning as an electrolytic capacitor. In various embodiments, both types of electrodes may be made of the same material capable of undergoing either P-doping or N-doping (e.g., type III) to thereby function as an electrolytic capacitor. In various embodiments, a scrim mat formed at least in part from microfibers made of conducting polymers may be added to the electrode to provide a EDLC functionality to the electrode.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention, as recited in the appended claims.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature. The term "coupling" includes creating a connection between two components that allows electrical current to flow between those components.

It is also important to note that the construction and arrangement of the electrical power storage devices, as shown in the various exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may be made in the design, operating conditions, and arrangement of the various exemplary embodiments without departing from the scope of the present inventions, as expressed in the appended claims.

What is claimed is:

1. An electrode comprising:
   a charge collector comprising a mat of fibers;
   wherein the charge collector is loaded with electrode active material; and
   wherein the fibers comprise a carbon selected from a group consisting of graphite, expanded graphite, activated carbon, carbon black, carbon nanofibers, and carbon nanotubes, and further wherein at least a portion of said fibers are selected from a group consisting of trilobal cross-sectional fibers, and quadrilobal cross-sectional fibers, with each lobe of the respective cross-sectional fibers having a radial section and an end section with the end section extending from and at least substantially orthogonal to the radial section.

2. The electrode of claim 1, where the fibers have a cross sectional diameter ranging from about 1 micron to about 100 microns.

3. The electrode of claim 1, wherein the fibers are shaped fibers.

4. The electrode of claim 1, wherein the fibers are microfibers.

5. The electrode of claim 1, wherein the mat is formed of a woven or non-woven mesh in a pattern to at least one of adhere and support the electrode active material.

6. A lead-acid battery comprising:
a positive electrode and a negative electrode contained within a housing having electrolyte; and
the negative electrode comprising a mat of fibers comprising a carbon selected from a group consisting of graphite, expanded graphite, activated carbon, carbon black, carbon nanofibers, and carbon nanotubes, wherein the fibers are loaded with electrode active material, and further wherein at least a portion of said fibers are selected from a group consisting of trilobal cross-sectional fibers, and quadrilobal cross-sectional fibers, with each lobe of the respective cross-sectional fibers having a radial section and an end section with the end section extending from and at least substantially orthogonal to the radial section.

7. The battery of claim 6, further comprising a separator between the positive electrode and the negative electrode.

8. The battery of claim 6, wherein the fibers have a cross sectional diameter ranging from about 1 micron to about 100 microns.

9. The battery of claim 6, wherein the fibers are shaped fibers.

10. The battery of claim 6, wherein the fibers are microfibers.

11. The battery of claim 6, wherein the mat is formed of a woven or non-woven mesh in a pattern to at least one of adhere and support the electrode active material.

12. The battery of claim 6, wherein the fibers are obtained from a group consisting of polyester, polypropylene, polyethylene, and polyethylene terephthalate.

13. The battery of claim 6, wherein the fibers are configured to help optimize charge acceptance.

* * * * *